No. 704,778. Patented July 15, 1902.
D. V. BROWN.
OPTICAL WIRE.
(Application filed Jan. 9, 1902.)

(No Model.)

WITNESSES: INVENTOR:
Daniel V. Brown
by his atty.

UNITED STATES PATENT OFFICE.

DANIEL V. BROWN, OF PHILADELPHIA, PENNSYLVANIA.

OPTICAL WIRE.

SPECIFICATION forming part of Letters Patent No. 704,778, dated July 15, 1902.

Application filed January 9, 1902. Serial No. 88,968. (No model.)

*To all whom it may concern:*

Be it known that I, DANIEL V. BROWN, a citizen of the United States of America, residing in the city and county of Philadelphia, in the State of Pennsylvania, have invented certain new and useful Improvements in Optical Wire, of which the following is a true and exact description, reference being had to the accompanying drawings, which form a part thereof.

My invention relates to the construction of what is known as "optical wire," from which the framing of eyeglasses and spectacles is made. Such wire has heretofore been made very largely by grooving a wire or thin bar of metal, generally of German silver, to receive the edges of the glasses; but such grooved-wire frames have proved defective, owing to their lack of extensibility, and they are also unduly heavy.

The object of my invention is to provide a grooved optical wire which will be at once light and strong and which will have the capacity of lightly grasping the glass framed in it, while at the same time it will permit the glass to expand without tending to rupture the wire or putting any strain on the edge of the glass.

My invention accordingly consists in forming a grooved optical wire of a thin metal plate, preferably German silver, by curving the plate transversely into a central trough-like section and turning in the edges thereof toward the bottom of the trough-like section to form a longitudinal groove bounded by two elastic tongues, between which the edges of the glass can be grasped and which will yield to any expansion of the glass without putting any undue strain on the wire or the glass itself. My wire not only allows for the taking up of expansive strain, as described, but is of great strength and requires less metal than the grooved solid wire heretofore used.

Figure 1:
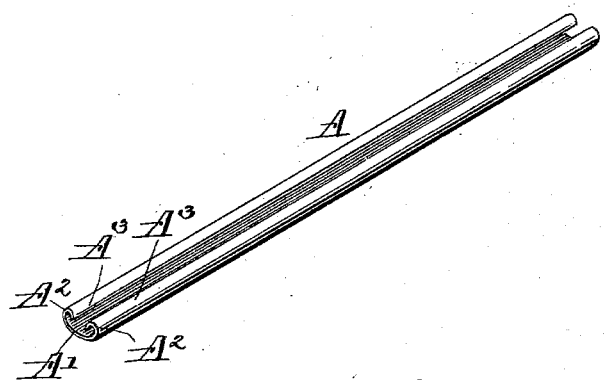
Figure 2:
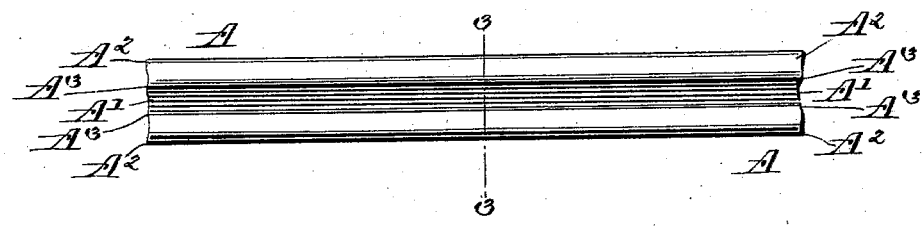
Figure 3:
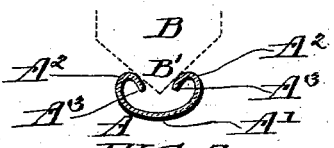

Reference being now had to the drawings, in which my invention is illustrated, Figure 1 is a perspective view of a section of my optical wire on a large scale. Fig. 2 is a plan view of a similar section on a still larger scale. Fig. 3 is a cross-section on the line 3 3 of Fig. 2, showing the lens in dotted lines; and Fig. 4 is a view of a pair of eyeglasses framed with my optical wire, showing about its natural size.

A indicates the wire, which is transversely curved, as shown best in Fig. 3, preferably having a broad central curvature in the center or "bottom," as I will call it, of the wire, as shown at A', merging into sharper lateral curves $A^2 A^2$ where the edges $A^3 A^3$ are turned inwardly and downwardly to form the longitudinal grooves of approximately the section of a truncated V, adapted to receive and hold the edge B' of a glass B. (See Fig. 3.)

It will be obvious that the tongues will move apart when exposed to any expansive strain from the glass, and thus permit such strains without disruptive strains on the wire.

Figure 4:
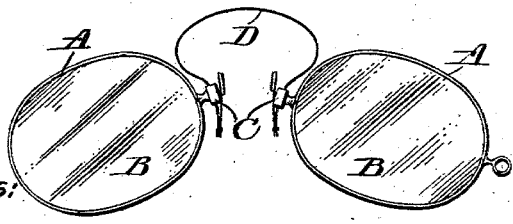

C C, Fig. 4, are parts fixed to the wire A and to which the spring D of the eyeglasses is attached.

Having now described my invention, what I claim as new, and desire to secure by Letters Patent, is—

1. An optical wire for framing eyeglasses and spectacles consisting of a thin metal plate having its central portion transversely curved into a trough-like section and its lateral edges curved inward toward the bottom of the central trough-like section to form a channel or groove of truncated-V shape between the elastic tongues formed by the said edges of the curved plate.

2. An optical wire for framing eyeglasses and spectacles consisting of a thin metal plate transversely curved to form a broad convex lower curve A' and relatively sharper lateral curves at $A^2 A^2$ with inwardly and downwardly extending edges $A^3 A^3$ forming a channel or groove bounded by the elastic edges of the curved plate.

D. V. BROWN.

Witnesses:
CHAS. F. MYERS,
D. STEWART.